June 14, 1966  S. SEDLAK  3,256,442
FLEXIBLE SHEET CONTAINING A HIGH PROPORTION OF RIGID MATERIAL
Filed Dec. 3, 1962  5 Sheets-Sheet 1

INVENTOR.
STEVE SEDLAK
BY
ATTORNEYS.

June 14, 1966   S. SEDLAK   3,256,442
FLEXIBLE SHEET CONTAINING A HIGH PROPORTION OF RIGID MATERIAL
Filed Dec. 3, 1962   5 Sheets-Sheet 3

INVENTOR.
STEVE SEDLAK
BY
ATTORNEYS.

June 14, 1966 S. SEDLAK 3,256,442
FLEXIBLE SHEET CONTAINING A HIGH PROPORTION OF RIGID MATERIAL
Filed Dec. 3, 1962 5 Sheets-Sheet 5
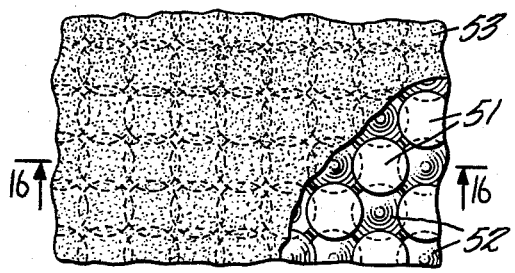
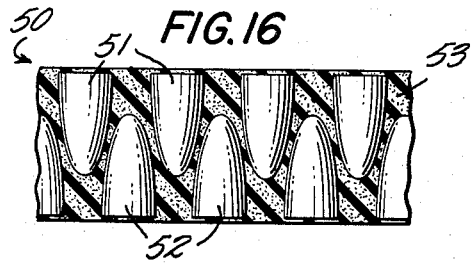
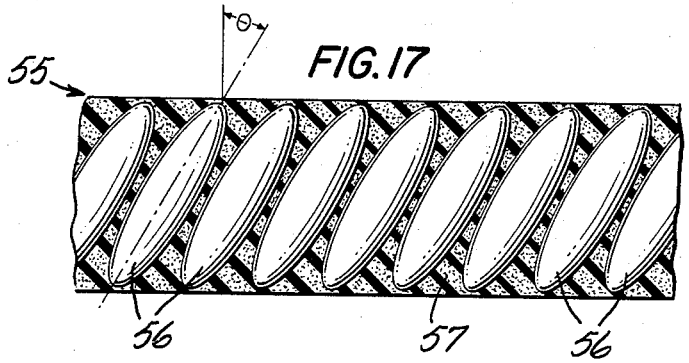
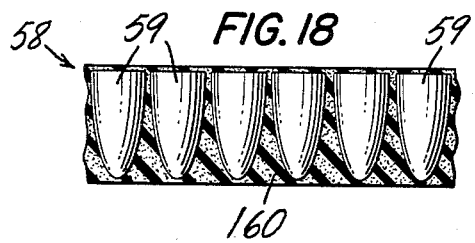
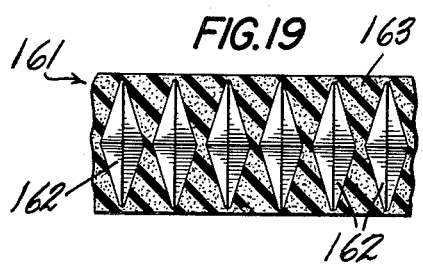
INVENTOR.
STEVE SEDLAK
BY
Brumbaugh, Free, Graves & Donohue
his ATTORNEYS

United States Patent Office 3,256,442
Patented June 14, 1966

3,256,442
FLEXIBLE SHEET CONTAINING A HIGH
PROPORTION OF RIGID MATERIAL
Steve Sedlak, % Perrin Stryker, 150 E. 73rd St.,
New York, N.Y.
Filed Dec. 3, 1962, Ser. No. 242,015
19 Claims. (Cl. 250—108)

This invention relates to flexible materials and, more particularly, to a new and improved flexible sheet material incorporating a large proportion of a relatively rigid substance. This application is a continuation-in-part of my copending application Serial No. 158,173, filed December 8, 1961, for "Flexible Radiation Shielding Material," now abandoned.

In certain instances, it is necessary to use a material which has substantial flexibility but which also includes properties normally found only in relatively rigid substances. Heavy metals, such as lead, tungsten and the like, are known as the best materials for use in radiation shielding, for example, but in the thicknesses necessary for adequate radiation protection, these materials are substantially inflexible. Very dense materials, such as the heavy metals are also known to be excellent sound absorbers if incorporated into a relatively non-rigid structure. Furthermore, the common magnetic materials, such as iron and nickel and their alloys, are also too rigid to be utilized in applications where some flexibility is required. In addition, there are many excellent buoyant materials such as foamed polystyrene and polyurethane which are too rigid to be used in applications where flexibility is desired.

Heretofore, flexible materials incorporating rigid substances have been made by dispersing a large number of small particles of the rigid substance into a pliable material or by forming chemical compounds which include atoms of the rigid substance. For example, flexible radiation shielding materials have been made by weaving a fabric of leaded glass fibers, by impregnating leather with concentrated lead solutions, and by incorporating powdered lead into a flexible material such as rubber. In all of these cases, however, the proportion of the rigid substance which can be incorporated into the flexible material without resulting in a serious loss of physical strength of the material or producing other deleterious physical or chemical changes is quite limited. Moreover, flexible magnetic materials made of magnetic particles incorporated into a pliable material are not highly effective because of the greatly reduced magnetic strength resulting from the subdivision of the magnetic material.

Accordingly, it is an object of the present invention to provide a new and improved flexible material incorporating a large proportion of relatively rigid material without impairing appreciably either the flexibility of the sheet or the desred characteristics of the rigid material.

Another object of the invention is to provide a flexible sheet material incorporating a large proportion of a relatively rigid material wherein flexibility of the sheet is facilitated by the shape and disposition of the elements of rigid material.

A further object of the invention is to provide a new and improved flexible sheet material capable of absorbing nuclear and other radiations.

Additional objects of the invention are to provide new and improved flexible sheet materials having magnetic, buoyant, or sound absorbing properties.

These and other objects of the invention are attained by embedding in a sheet of pliable material, a plurality of relatively rigid members which are disposed in substantially uniform predetermined relation and which are tapered in a direction transverse to the extent of the sheet.

For maximum flexibility of the sheet material, the relatively rigid members are arranged so that the ratio of the areas of rigid material to pliable material decreases in successive layers progressing from the center of the sheet toward both sides and, to facilitate relative rocking of the members upon bending of the sheet, the members may have convexly curved outer surfaces. In one embodiment, the rigid members are in the form of ellipsoids having their major axes perpendicular to the extent of the sheet. In another form, particularly useful for radiation shielding, ellipsoids of radiation absorbing material are inclined at an angle from the perpendicular to the sheet to reduce leakage through the spaces between them. The pliable medium in which the rigid members are embedded expands and compresses upon flexure and may have other desirable properties depending upon the particular uses intended.

Further objects and advantages of the invention will be apparent from a reading of the following description in conjunction with the accompanying drawings, in which:

FIG. 15 is a plan view, partly broken away, illustrating another embodiment of the invention utilizing an array of semiellipsoidal rigid members tapering inwardly from opposite sides of the sheet of material;

FIG. 16 is a view in cross-section, taken along the line 16—16 of FIG. 15;

FIG. 17 is a sectional view of a further form of the invention wherein an array of ellipsoidal members is embedded in the material at an angle to the perpendicular;

FIG. 18 shows another sheet material according to the invention having substantial flexibility in one direction and less flexibility in the opposite direction; and FIG. 19 illustrates an additional embodiment wherein the rigid members are of double pyramidal shape.

Figure 1:
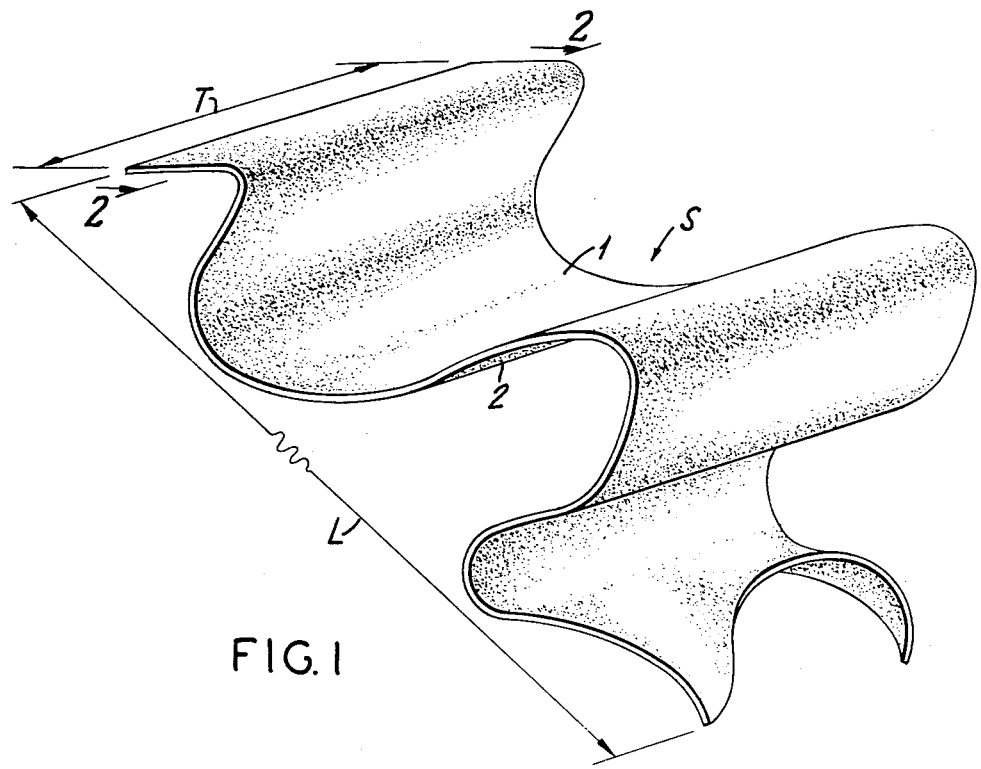
FIG. 1 is a perspective view of a representative sheet of flexible material according to the invention, showing its flexibility.
Figure 2:
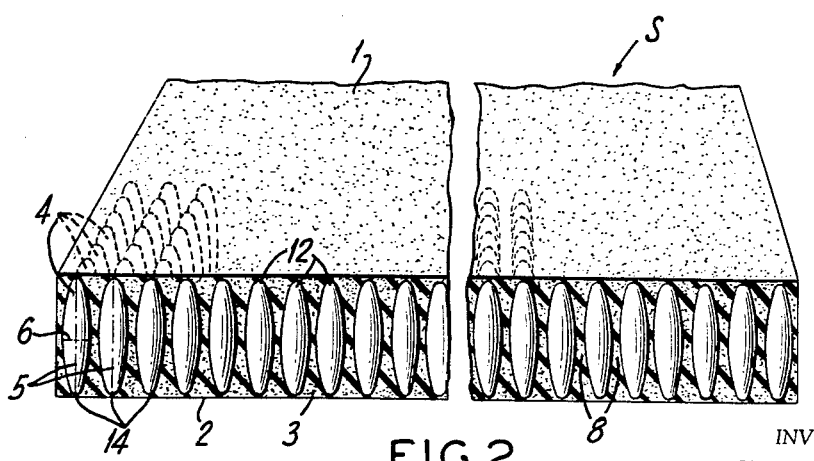
FIG. 2 is an enlarged perspective view, partly in section as viewed from the line 2—2 of FIG. 1, showing a plurality of rigid members shaped as ellipsoids arranged in a square array.

As shown in FIG. 1, the sheet S is flexible both lengthwise (L) and transversely (T). Referring to FIG. 2, the flexible sheet S is shown in cross-section having a surface 1 and an opposite parallel surface 2. For radiation absorbing flexible materials, the thickness of the sheet may vary from 1/32 inch or less to one inch or more, but generally will range from 1/8 to 5/8 inch. In other applications, such as buoyant materials, the sheet may be several inches thick. The body of the sheet is composed of a matrix 3 of a resilient or elastic material such as natural or synthetic rubber or any other substance, including plastics, which give the required physical properties dependent upon particular use.

Embedded in the matrix is a series of curved, elongated members 4 made of a relatively rigid material having the physical or other characteristics which it is desired to impart to the flexible sheet. In the case of radiation absorbing material, these members are made of a radiation absorbing material such as tungsten or lead, which will absorb the energy of incident nuclear radiation. For sound absorbing flexible sheets, the same materials may be used in view of their high density, along with any other relatively heavy material. In a flexible magnetic sheet, the rigid members are, of course, magnets having polarities oriented in the same direction and in a flexible buoyant sheet each member may be made of a very light, rigid material such as foamed polystyrene, polyurethane or the like, or may comprise a rigid hollow capsule of a material such as celluloid or plastic.

Figure 3:
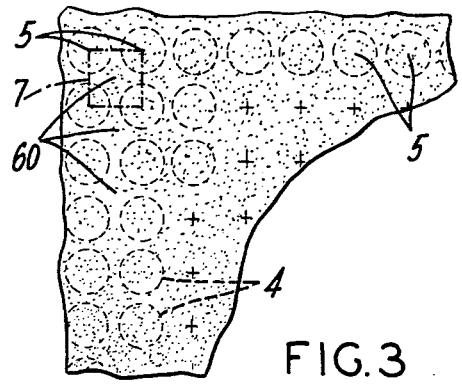
FIG. 3 is a plan view of a portion of FIG. 2 showing the relatively rigid members arranged in a square array.

In the embodiment shown in FIG. 2, the rigid members are of a length substantially equal to the thickness dimension of the sheet from surface 1 to surface 2 with their extremities 12 and 14 in proximity to the planes of the surfaces 1 and 2, respectively. In their preferred form, the members are ellipsoidal in shape, each having a major axis 5 and a shorter minor axis 6. The members 4 are arranged with their longest dimensions or major axes parallel and uniformly spaced from each other both lengthwise and transversely of the material to form a square array 7 as indicated in FIG. 3.

Due to their shape, the relatively rigid members have convex curved side walls which may touch each other at their points of closest proximity. However, in the preferred arrangement of the members, provision is made for surrounding each member with the resilient matrix as shown at 8 in FIG. 2.

Figure 5:
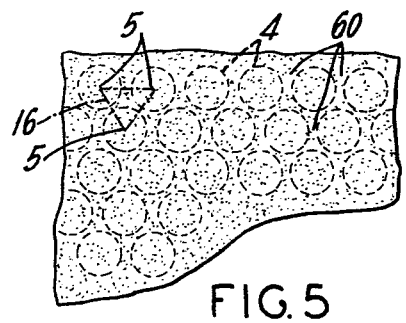
FIG. 5 is a detail plan view of a modified form of the sheet showing the rigid members arranged in a triangular array.

The relative fixed position of each rigid member with respect to its adjacent members can either be random or according to a particular geometric pattern. In the geometric arrangement, square and triangular patterns result in two of the simplest configurations. FIG. 3 shows a square array and FIG. 5 shows a triangular array. In the square array, the longest dimensions or major axes of four proximate rigid members occupy the corners of a square as shown by the dotted lines 7 in FIG. 3. In the triangular array the longest dimensions or major axes of three proximate rigid members occupy the corners of an equilateral triangle as shown by the dotted lines 16 in FIG. 5. The triangular array gives a higher packing proportion of the rigid members than the square array. Other arrays than those described are possible and rearrangements of the rigid members in various configurations other than those described will yield sheets of comparable flexibility but with differing percentage volumetric content of rigid members and resilient matrix. These two arrays suffice to illustrate the invention, but other arrays may, of course, be used within the scope of this invention.

Figure 6:
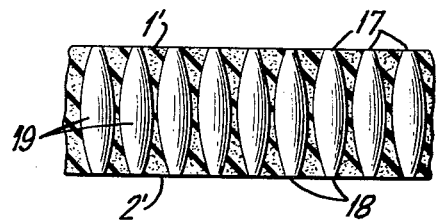
FIG. 6 is a cross-sectional view of a further modification of the sheet showing rigid members which are truncated at opposite ends.
Figure 7:
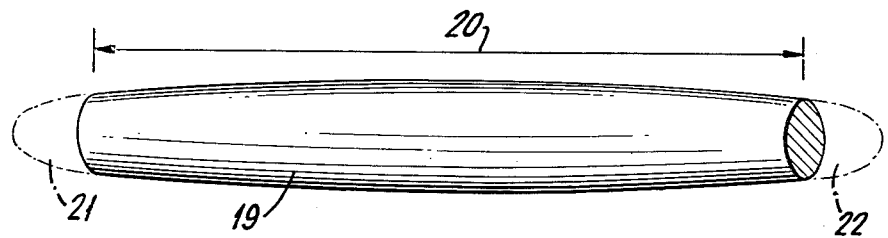
FIG. 7 is an enlarged view of the relatively rigid member of FIG. 6 in the shape of a truncated ellipsoid.

An additional modification of the invention is illustrated in FIG. 6 where the rigid members 19 are truncated at opposite ends as shown at 17 and 18 forming plane surfaces lying substantially in the planes of surfaces 1' and 2', respectively, of the sheet. An enlarged view of one of the rigid members 19 is illustrated in FIG. 7 as an ellipsoid with truncation. The length 20 of the member is approximately equal to the thickness of the flexible sheet and the removal by truncation of the portions 21 and 22 improves the volumetric content of the rigid members in the flexible sheet.

Figures 10, 11, 12:
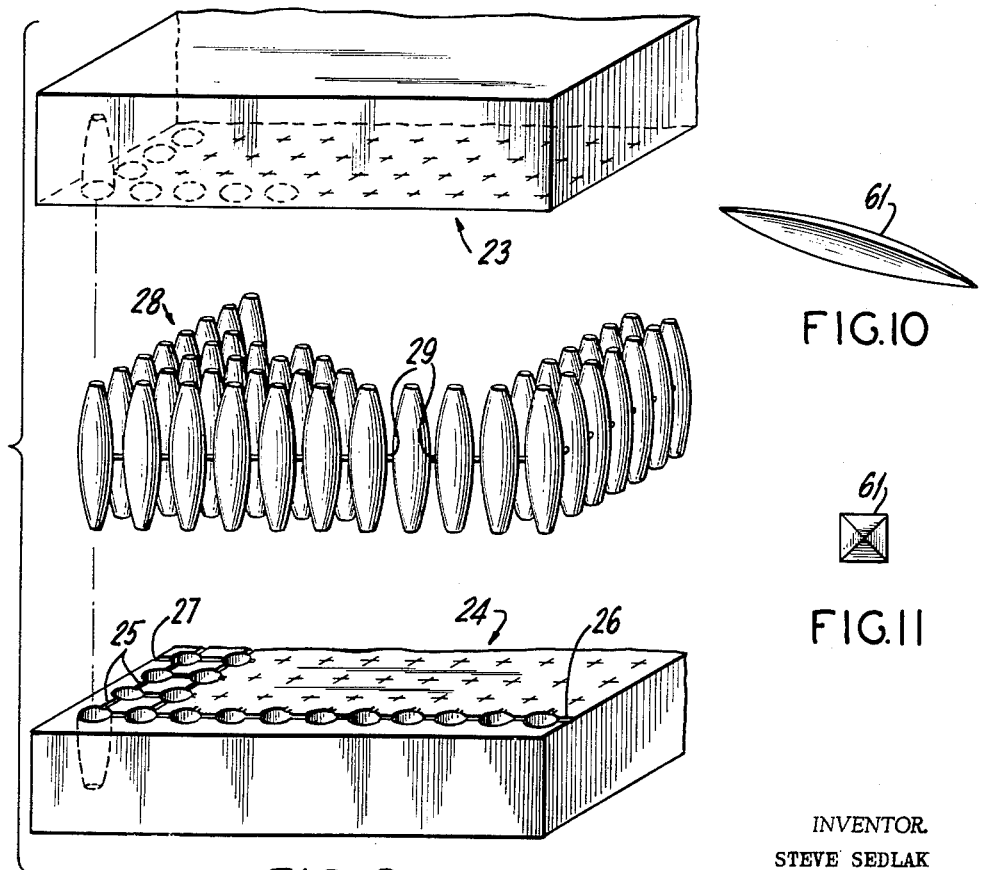
FIG. 10 is an enlarged perspective view of a typical small member of FIG. 8 in the shape of an elongated solid tapering towards the ends with a square cross section.
FIG. 11 is an end view of the member of FIG. 10.
FIG. 12 is a perspective exploded view illustrating certain steps of my preferred method of fabricating an array of rigid members by means of a casting process.
Figure 13:
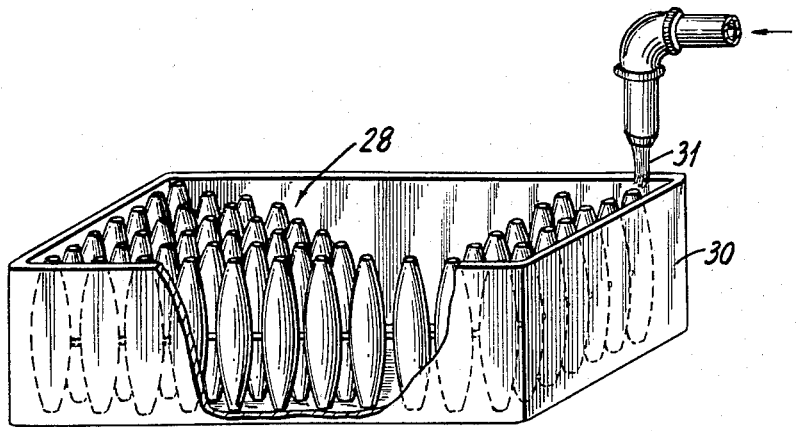
FIG. 13 is a perspective view of a method of combining the array of truncated ellipsoidal members shown in FIG. 12 with a resilient matrix.
Figure 14:
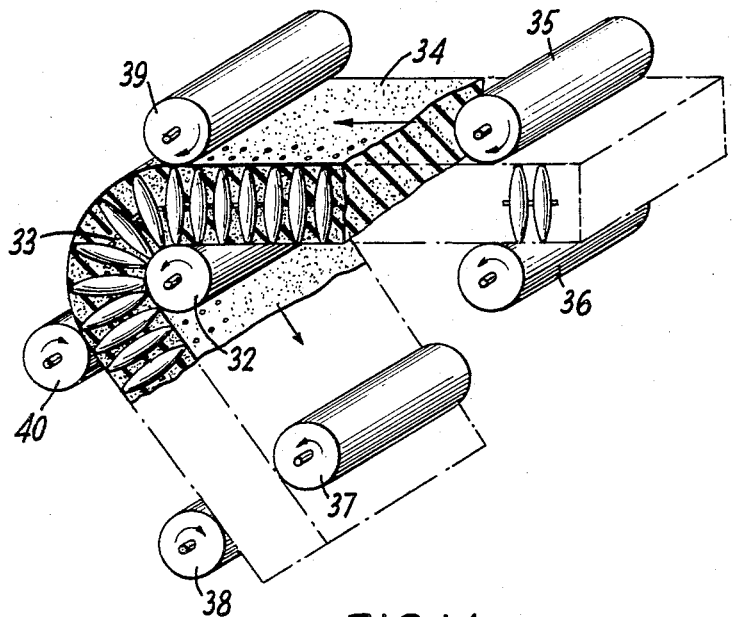
FIG. 14 is a perspective view showing a method of breaking the connecting bridges formed in the casting process between the truncated ellipsoidal members after the resilient matrix has solidified.

The manufacture of the flexible material according to the invention may follow a number of practices. One method useful in cases in which the rigid material may be molded from a liquid form, as lead, for example, is illustrated in FIGS. 12, 13 and 14. The rigid members of the flexible sheet may be formed by means of a mold consisting of the two sections 23 and 24 shown in FIG. 12. The cavities of these molds will impart the desired shape to the various members of the casting. The lower section 24 contains a series of grooves 25 on its upper surface which act as channels connecting adjacent cavities. With the two sections 23 and 24 of the mold closed, molten material, such as lead or lead alloy, is poured in at aperture 26 and allowed to freely fill all the internal spaces of the mold. Vent 27 permits the air to escape. Upon the metal solidifying, the mold sections are separated producing the array shown at 28. This array is removed as a single piece from the lower section since the individual members are held together by the connectors 29 of solidified metal.

The next step in the manufacture is illustrated in FIG. 13. In this step, the connected array of rigid members is deposited as a unit in tray 30 and a flexible compound in fluid form 51, such as an elastomer, is allowed to flow freely into the tray. If desired, the array of rigid members may be coated with an adhesive material before introducing the flexible compound. The fluid elastomeric compound flows around the rigid members, filling the tray and becoming bonded to all the surfaces of all the members. After the resilient matrix has solidified, the combined product, in the form of a sheet, is removed from the tray.

The final step in the manufacturing process is illustrated in FIG. 14, where the sheet 34, thus formed, is fed in the direction shown by arrows through feed rolls 35 and 36, around roll 32 and withdrawn by rolls 37 and 38. The rolls 35, 36, 37 and 38 may be power driven. As the sheet passes sharply around roll 32, it is held firmly to the surface of roll 32 by suitable pressure rolls 39 and 40. The diameter of roll 32 may be equal to or less than the thickness of the sheet. The sharp bending of the sheet around roll 32 causes connectors 29 between the rigid members to break as shown at 33. In the case of a sheet where the rigid members are arranged in a square array, two passes of the sheet may be required through the mechanism to assure that all connectors are broken; one pass as shown and one pass at right angles to that shown. For flexible magnetic sheet material, powdered iron or iron alloy may be shaped into the same array by dies similar to the molds 23 and 24 and then sintered and magnetized.

The resultant flexible sheet may be cut by appropriate cutting devices into the required sizes. Lead, being a soft ductile metal, may be cut where the sheet is of small thickness, by hand shears, while for larger thicknesses and for other rigid materials, power shears or saws may be required. Since the surface of the sheets is predominantly composed of the resilient matrix material, it can be joined to itself by slight overlapping and cementing of the overlapped joints and, in the case of radiation absorbing material, protective garments may be made in this manner. If desired, the tip ends of the rigid members may, of course, be concealed from view by a thin surface coating of the resilient material for which purpose the array 28 would be positioned and supported in the mold 30 (FIG. 13) so the lower extremities of the rigid members are spaced from the bottom of the mold by a dimension equal to the thickness of the desired surface coating.

Figure 4:
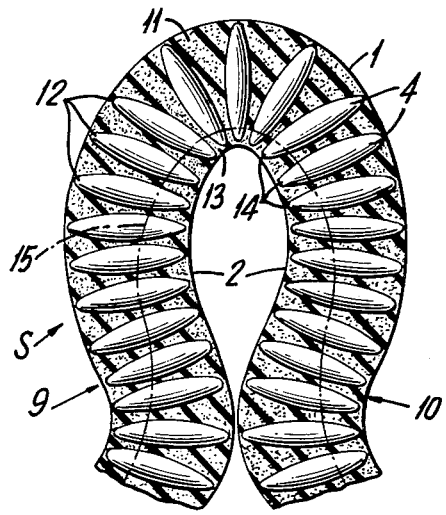
FIG. 4 is a detail cross-sectional view of the sheet showing how the rigid members accommodate to severe bending.

The sheeting when constructed in accordance with my invention is highly flexible as illustrated in FIG. 4. The rigid members easily accommodate to flexure of the material, even under extreme bending distortion, as the result of opposed pressure applied at 9 and 10. The resilient matrix stretches at 11 as the outermost extremities 12 of the rigid members spread apart. The resilient matrix compresses at 13 as the innermost extremities 14 of the members move toward each other. The convexly curved side walls of the rigid members undergo a relative rocking motion with respect to each other. Their points of closest proximity move inwardly from midway of the length of the members toward the inner extremities in a degree dependent upon the severity of the bending. Line 15 represents the locus of such points of closest proximity. The sheet, of course, returns to the position shown in FIG. 2 upon release of the applied pressures.

The preferred shape for the rigid members is, as stated, the ellipsoidal form. An ellipsoid is formed by rotating a plane ellipse figure about its major axis, thus forming an ellipsoid of revolution. The plane ellipse figure, which is used to generate the ellipsoid, is defined as a curve such that the sum of the distances from any point on the curve to two fixed points is constant. A straight line drawn through the two fixed points, or foci, and touching the curve at opposite ends is the major axis. A straight line drawn through the center of the ellipse, or midpoint of the two foci, at right angle to the major axis and touching the curve at opposite ends is the minor axis. The ratio of the minor axis to the major axis specifies the shape of the ellipsoid.

The relative amount of rigid material within the flexible sheet may be expressed in terms of the percentage volumetric content of the rigid elements to the total content. For example, a completely non-rigid material will have a percentage volumetric content approximating zero percent; a sheet made of rigid material only will have a percentage volumetric content approximating 100 percent. Flexible sheet materials according to the invention will have values falling within these two limiting values, since they are composed of a mixture of non-rigid and rigid elements. Once the volumetric content of the rigid elements and the densities of the component materials are known, calculations may be made to find the weight or mass ratio of the rigid material to the total material; and, also, the average density of the flexible sheet. The actual volumetric content of the rigid elements in the invention will depend on several factors, such as, the type of array, the shape and degree of truncation of the rigid members, the amount of initial separation between members in the unflexed position, the use of ellipsoid or other form, etc. Theoretical calculations yield a figure of about 90 percent as a maximum volumetric content for the rigid members using ellipsoidal shaped members with a very high degree of truncation, arranged in a triangular array, and without any space between their points of closest proximity in the unflexed position. I prefer to use no less than a minimum of about 50 percent.

The rigid members may or may not touch at their points of closest proximity. In the preferred arrangement of the invention, each rigid member is completely surrounded by the resilient matrix so that the matrix remains a continuous whole under all bending conditions. Therefore, the rigid members will not be in direct contact with each other when the sheet is in the unflexed position. The space between the members is very small and measures only a fractional part of the minor axis dimension of the rigid members.

When the flexible sheet material according to the invention is made with radiation-absorbent rigid members to provide a flexible radiation shield, the resilient or elastic substances used in the matrix are preferably also designed to be absorbent to incident nuclear radiations. There are two certain advantages in using resilient or elastic substances specifically designed for radiation absorption as part of the matrix of the invention. First, the absorbent material in the resilient or elastic matrix, being additional to the rigid elongated members, will increase the total amount of absorbent substances in the flexible sheet, and thus raise the percentage volume content of absorbent substances in the sheet. Second, the radiation absorbent matrix, being located in the spaces not occupied by the solid elongated members, will contribute to making the product more nearly homogeneous in its absorbent characteristics from either surface. Absorbent resilient or elastic substances for the matrix may be rubber-lead and the like. Also, any resilient, plastic, rubber or elastomeric substance, either natural or synthetic, combined with radiation absorbent elements, such as lead, tungsten, etc., either physically or chemically, and with suitable physical characteristics to insure flexure upon bending, with the embedded solid elongated members, may be employed for the purpose. Two or more dissimilar resilient or elastic materials, with or without radiation absorbent substances, may be combined and employed for the same purpose. Likewise, in flexible sheet materials used as sound absorbers, for example, it may be desirable to increase the volumetric content of the dense, rigid substance by incorporating it into the matrix material in a similar manner and, in flexible magnetic sheets, magnetizable powder may be included in the pliable matrix.

Figure 8:
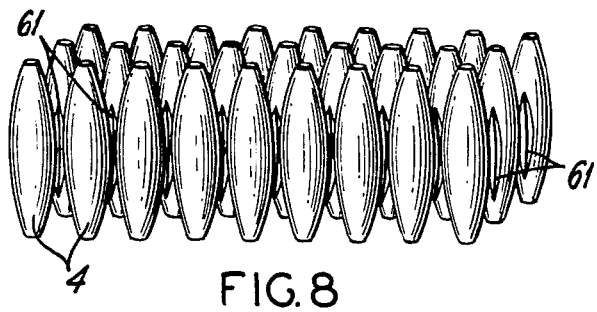
FIG. 8 is an enlarged perspective view showing the truncated rigid members arranged in a square array containing small rigid members within the interstices between the larger rigid members.
Figure 9:
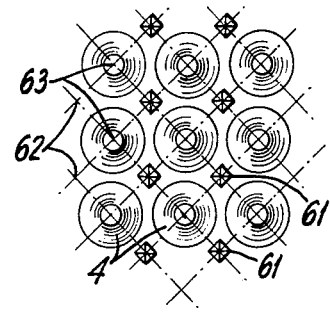
FIG. 9 is a detail plan view of a portion of FIG. 8.

Referring to FIGS. 3 and 5, there are spaces 60 between the large rigid members 4. To provide a more homogeneous sheet, these spaces may contain smaller rigid members made of the same material without hindering the relative rocking motion of the larger members 4 with respect to each other. FIG. 8 shows an array in which small rigid members 61 are placed in the spaces between large rigid members 4. In this case, a square array is illustrated, and a plan view of a section of the sheet is illustrated in FIG. 9. The small members 61 in FIG. 8 are shown located and centered on the intersection of lines 62 drawn diagonally through the centers 63 of large rigid members 4. FIG. 10 shows a typical small rigid member 61 in perspective. The member is elongated in form, tapering from its midpoint towards its ends. The side walls curve convexly from its midpoint to its ends, so as to accommodate the relative rocking motion of the large rigid members with respect to the small members and with respect to each other. FIG. 11 shows the square shape as viewed from one end, but the members may also be circular, or square with rounded corners, or square with transversely curved side walls. The addition of small rigid members between the large rigid members, embedded within the resilient matrix, yields a flexible sheet of higher volumetric content of rigid substance for comparable truncation, array, etc., than without the smaller members.

In FIGS. 15 and 16 another form of the invention providing greater homogeneity of the rigid substance in the sheet material is shown. According to this form, a sheet 50 includes a first series of semi-ellipsoids 51 made of rigid material disposed with their flat ends adjacent to one surface of the sheet and tapered ends directed toward the opposite surface of the sheet and a second series of rigid semi-ellipsoids 52 oriented in the opposite direction and interposed between the ellipsoids 51 in a matrix material 53. Although the flexibility of a sheet made in this manner is somewhat less than that of the sheet shown in FIG. 2, for example, this arrangement has the advantage that it substantially eliminates gaps between the rigid members as viewed perpendicularly to the sheet material. This is illustrated in the plan view of FIG. 15.

Another form of the invention which provides a similar advantage is shown in FIG. 17. In this case, a flexible sheet 55 is made of a plurality of rigid ellipsoids 56, similar to those of FIG. 2, embedded in a matrix material 57 at an angle θ to the perpendicular. The angle θ is preferably selected to provide an appreciable overlap of the rigid members when viewed perpendicularly to the sheet and, if desired, the rigid members may also be tilted alternately in opposite directions with respect to the plane of FIG. 17 to eliminate all gaps between the members as viewed perpendicularly to the sheet.

For certain applications it may be desirable to provide a sheet which has substantial flexibility in one direction and more limited flexibility in the opposite direction. An arrangement suitable for this purpose is shown in FIG. 18 wherein a sheet 58 comprises an array of semi-ellipsoids 59 embedded in a matrix material 160 with the flat ends of all the semi-ellipsoids adjacent to one surface of the sheet and the tapered ends extending toward the opposite surface. A sheet of this type may for example be conveniently rolled into a tubular shape.

Although rigid members having convexly shaped surfaces are preferred because the surfaces facilitate rocking action of the members during flexing of the sheet, any other shape providing a taper in the direction across the sheet may also be used. In FIG. 19, for example, a flexible sheet 161 is made of an array of rigid members 162 which have a double-pyramid shape and are embedded in a flexible matrix 163. The pyramidal shape of the illustrated members 162 is of the rectangular type but it will be apparent that other polygonal pyramidal shapes may also be used or that circular conical surfaces could be provided at both ends of the members instead of pyramidal surfaces.

Although the invention has been described herein with reference to certain specific embodiments, many modifications and variations therein will readily occur to those skilled in the art. Accordingly, all such variations and modifications are included within the intended scope of the invention as defined by the following claims.

I claim:

1. A flexible sheet containing a high proportion of rigid material comprising a matrix made of pliable material having substantially parallel opposite surfaces and a plurality of solid elongated relatively rigid members of similar shape and size embedded therein in a substantially uniform predetermined relation, the pliable matrix completely surrounding the embedded members and being continuous throughout the thickness of the sheet, said members having generally parallel directions of elongation and being tapered at least from the center of their elongated length to one end.

2. A flexible sheet containing a high proportion of rigid material according to claim 1 wherein the proportion of the area of the rigid members to the area of the pliable material decreases in successive planes in the sheet progressing substantially from the center of the sheet toward the opposite surfaces thereof.

3. A flexible sheet containing a high proportion of rigid material according to claim 1 wherein the rigid members have outer surfaces which are surfaces of revolution about axes extending transversely to the extent of the sheet.

4. A flexible sheet containing a high proportion of rigid material according to claim 3 wherein the rigid members have convexly shaped outer surfaces which are surfaces of revolution about axes extending transversely to the extent of the sheet.

5. A flexible sheet containing a high proportion of rigid material according to claim 4 wherein the rigid members have surfaces which are ellipsoidal in shape.

6. A flexible sheet containing a high proportion of rigid material according to claim 1 wherein the rigid members have pyramidal shaped outer surfaces.

7. A flexible sheet containing a high proportion of rigid material according to claim 1 wherein each of the rigid members is tapered substantially from the center of the sheet toward both opposite surfaces thereof.

8. A flexible sheet containing a high proportion of rigid material according to claim 1 wherein the taper of each of the rigid members extends substantially from one surface of the sheet toward the opposite surface thereof.

9. A flexible sheet containing a high proportion of rigid material according to claim 8 wherein the tapers of adjacent rigid members extend in opposite directions across the sheet.

10. A flexible sheet containing a high proportion of rigid material according to claim 8 wherein the tapers of all of the rigid members extend in the same direction across the sheet.

11. A flexible sheet containing a high proportion of rigid material according to claim 1 wherein each of the rigid members is made of a dense radiation absorbing material.

12. A flexible sheet containing a high proportion of rigid material according to claim 11 wherein the pliable matrix is impregnated with small particles of a radiation absorbing material.

13. A flexible sheet containing a high proportion of rigid material according to claim 11 including a plurality of secondary relatively rigid members made of a radiation absorbing material located in the spaces between the rigid members of the first mentioned plurality.

14. A flexible sheet containing a high proportion of rigid material according to claim 1 wherein each of the rigid members is made of a dense material to provide high sound absorbing characteristics.

15. A flexible sheet containing a high proportion of rigid material according to claim 1 wherein each of the rigid members comprises a permanent magnet.

16. A flexible sheet containing a high proportion of rigid material according to claim 1 wherein each of the rigid members has a low density so as to impart buoyancy to the sheet material.

17. A flexible sheet containing a high proportion of rigid material comprising a plurality of relatively rigid members and a pliable matrix in which the members are embedded, the matrix having opposite surfaces and being of predetermined thickness therebetween, each of the members being shaped as a surface of revolution about an axis, the members being arranged in the matrix with their axes extending through the matrix substantially parallel with each other, said members being of a length approximating said predetermined thickness so that their extremities lie in proximity to the opposite surfaces of the matrix, the side wall of each member extending convexly toward the side walls of those in proximity to it to facilitate a relative rocking motion of adjacent members in the flexure of the material.

18. A flexible sheet containing a high proportion of rigid material comprising a plurality of relatively rigid members and a pliable matrix in which the members are embedded, the matrix having opposite surfaces and being of predetermined thickness therebetween, the members being elongated in form, each with a major axis and a shorter minor axis, and arranged in the matrix with their major axes extending through the matrix substantially parallel with each other, said members being of a length approximating said predetermined thickness so that their extremities lie in proximity to the opposite surfaces of the matrix, the side wall of each member extending convexly toward the side walls of those in proximity to it to facilitate a relative rocking motion of adjacent members in the flexure of the material.

19. A flexible sheet containing a high proportion of rigid material comprising a plurality of relatively rigid members and a pliable matrix in which the members are embedded, the matrix having opposite surfaces and being of predetermined thickness therebetween, each of the members being shaped as a surface of revolution about an axis, the members being arranged in the matrix with their axes extending through the matrix substantially parallel with each other, said members being truncated at each end and being of a length approximating said predetermined thickness so that their truncated extremities lie in proximity to the opposite surfaces of the matrix, the side wall of each member extending convexly toward the side walls of those in proximity to it to facilitate a relative rocking motion of adjacent members in the flexure of the material.

References Cited by the Examiner

UNITED STATES PATENTS

| | | | |
|---|---|---|---|
| 846,534 | 3/1907 | Voorhees | 2—2 |
| 1,528,310 | 3/1925 | Strzyczkowski | 161—69 |
| 1,926,916 | 9/1933 | Reenes | 217—35 |
| 2,642,542 | 6/1953 | Weinberg | 250—108 |
| 3,045,121 | 7/1962 | Leguillon | 250—108 |
| 3,065,351 | 11/1962 | Weinberger | 250—108 |
| 3,078,183 | 2/1963 | Karalus | 117—122 |

FOREIGN PATENTS

| | | |
|---|---|---|
| 1,175,282 | 3/1959 | France. |
| 2,238,736 | 7/1960 | France. |

RALPH G. NILSON, *Primary Examiner.*

JAMES L. LAWRENCE, *Examiner.*